(12) United States Patent
Yamamoto

(10) Patent No.: US 11,610,327 B2
(45) Date of Patent: Mar. 21, 2023

(54) IMAGE PROCESSING APPARATUS, IMAGE PROCESSING METHOD, AND IMAGE PROCESSING PROGRAM

(71) Applicant: FUJITSU LIMITED, Kawasaki (JP)

(72) Inventor: Takuma Yamamoto, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 182 days.

(21) Appl. No.: 17/232,219

(22) Filed: Apr. 16, 2021

(65) Prior Publication Data

US 2021/0366145 A1   Nov. 25, 2021

(30) Foreign Application Priority Data

May 21, 2020   (JP) .............................. JP2020-089138

(51) Int. Cl.
  *G06T 7/00*   (2017.01)
  *G06T 7/70*   (2017.01)
  (Continued)

(52) U.S. Cl.
  CPC ............... *G06T 7/70* (2017.01); *G06T 5/002* (2013.01); *G06T 7/564* (2017.01); *G06T 2207/20081* (2013.01)

(58) Field of Classification Search
  CPC .......... G06T 7/70; G06T 5/002; G06T 7/564; G06T 2207/20081; G06T 2207/20084; G06T 2207/20096; G06T 7/194; G06T 7/11; G06T 1/20; G06T 7/90; G06T 7/10; G06T 7/12; G06T 7/62; G06T 11/20; G06T 11/60; G06T 11/203; G06T 2200/24; G06T 17/20; G06T 7/187; G06T 2207/20124; G06T 2207/20104; G06T 7/149;
  (Continued)

(56) References Cited

U.S. PATENT DOCUMENTS

2006/0245645 A1* 11/2006 Yatziv .................. G06T 5/005
  382/167
2007/0165966 A1* 7/2007 Weiss ................... H04N 5/272
  382/284

(Continued)

FOREIGN PATENT DOCUMENTS

JP   2007-293597 A   11/2007
JP   2014-523019 A   9/2014
  (Continued)

OTHER PUBLICATIONS

Seoung Wug et al. "Fast User-Guided Video Object Segmentation by Interaction-and-Propagation Networks" Proceedings of the IEEE Conference on Computer Vision and Pattern Recognition, 2019, pp. 5247-5256 (Total 10 pages).

*Primary Examiner* — Jose L Couso

(74) *Attorney, Agent, or Firm* — Fujitsu Patent Center

(57) ABSTRACT

An image processing apparatus includes a memory and a processor coupled to the memory and configured to perform acquiring object area information representing an image area of a target object in an image from an image database, using the object area information to calculate a distance map representing distance values from a contour of the target object inside the image area, and generating, based on the distance map, a line of points representing a curved line reflecting a global shape of the target object.

7 Claims, 12 Drawing Sheets

(51) Int. Cl.
  *G06T 5/00*     (2006.01)
  *G06T 7/564*    (2017.01)

(58) Field of Classification Search
  CPC ..... G06T 30/347; G06T 3/4046; G06T 9/002;
      G06K 9/6256; G06K 9/34; G06K 9/44;
      G06K 9/00154; G06K 9/00335; G06K
      9/6215; G06K 9/6274; G06K 9/6277;
      G06K 7/1482; G06N 3/0454; G06N 3/02;
      G06N 3/08–088; G06N 3/0445; G06N
      7/00; G06N 20/00; G06V 10/26; G06V
      10/34; G06V 10/764; G06V 40/20; G06V
      40/30; G06V 40/347; G06V 10/454;
      G06V 10/82; G06V 30/18057; G06F
      2111/12; G06F 30/10; G06F 30/12; G06F
      30/23; G06F 2211/04; G06F 3/04845;
      G06F 3/017

See application file for complete search history.

(56) References Cited

U.S. PATENT DOCUMENTS

| | | | | |
|---|---|---|---|---|
| 2009/0278859 A1* | 11/2009 | Weiss | ............ | H04N 5/275 345/629 |
| 2009/0304280 A1* | 12/2009 | Aharoni | ............ | G06T 7/162 382/190 |
| 2011/0274352 A1* | 11/2011 | Blake | ............ | G06T 7/194 382/173 |
| 2014/0321750 A1 | 10/2014 | Nouri et al. | | |
| 2015/0379720 A1* | 12/2015 | Herraez | ............ | H04N 13/261 348/43 |
| 2017/0140236 A1* | 5/2017 | Price | ............ | G06N 3/0454 |
| 2017/0220230 A1* | 8/2017 | Price | ............ | G06T 7/215 |
| 2020/0020141 A1 | 1/2020 | Sakai et al. | | |

FOREIGN PATENT DOCUMENTS

| | | | |
|---|---|---|---|
| JP | 2018-163426 A | 10/2018 | |
| WO | WO-2012144957 A1 * | 10/2012 | ......... B01D 53/0438 |
| WO | 2012/175447 A1 | 12/2012 | |
| WO | WO-2013189101 A1 * | 12/2013 | ......... G06K 9/00281 |

* cited by examiner

FIG.6
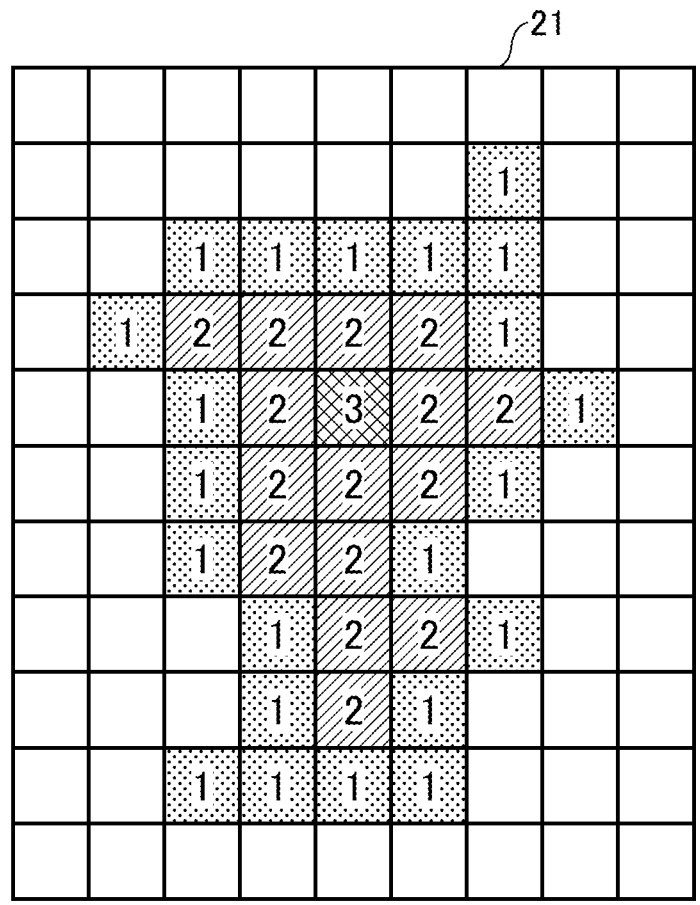
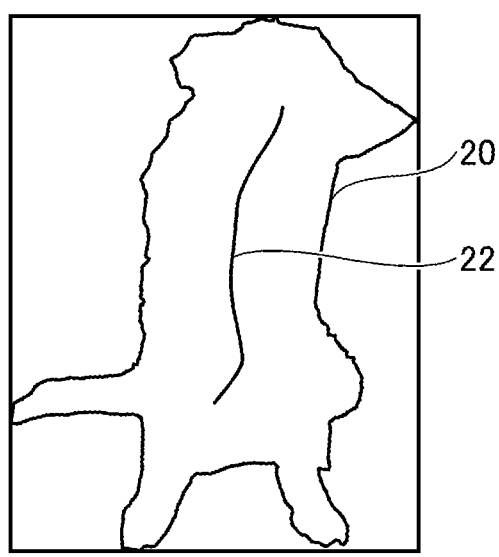

IMAGE PROCESSING APPARATUS, IMAGE PROCESSING METHOD, AND IMAGE PROCESSING PROGRAM

CROSS-REFERENCE TO RELATED APPLICATIONS

The present application is based upon and claims the benefit of priority from the prior Japanese Patent Application No. 2020-089138 filed on May 21, 2020, with the Japanese Patent Office, the entire contents of which are incorporated herein by reference.

FIELD

The disclosures herein relate to an image processing apparatus, an image processing method, and a recording medium having an image processing program recorded therein.

BACKGROUND

In a segmentation technique for separating an image area of a target object from other images such as a background image or the like, interactive segmentation as known in the art identifies an area to be separated based on a user input as a cue. Interactive segmentation is an important fundamental technology in image processing, and is used in a variety of applications. For example, the preparation of training data for machine learning may utilize interactive segmentation to greatly simplify a task of annotating target objects.

As a user input cue known in the art, a scribble is a free-form curve input by a user to run through the interior of an object for specifying the target object.

RELATED ART DOCUMENTS

Patent Document

[Patent Document 1] Japanese National Publication of International Patent Application No. 2014-523019
[Patent Document 2] Japanese Laid-open Patent Publication No. 2018-163426
[Patent Document 3] Japanese Laid-open Patent Publication No. 2007-293597

Non-Patent Document

[Non-Patent Document 1] Oh, Seoung Wug, et. al. "Fast user-guided video object segmentation by interaction-and-propagation networks." Proceedings of the IEEE Conference on Computer Vision and Pattern Recognition 2019.

SUMMARY

According to an aspect of the embodiment, an image processing apparatus includes a memory and a processor coupled to the memory and configured to perform acquiring object area information representing an image area of a target object in an image from an image database, using the object area information to calculate a distance map representing distance values from a contour of the target object inside the image area, and generating, based on the distance map, a line of points representing a curved line reflecting a global shape of the target object.

The object and advantages of the embodiment will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 6 is a drawing illustrating an example of a distance map obtained by distance transform.

DESCRIPTION OF EMBODIMENTS

There are several types of cues that a user enters for interactive segmentation. In a bounding box approach, the user inputs a bounding box enclosing a target object to specify the object. In this method, when the target object has an opening (i.e., hole) as a doughnut does, for example, a bounding box enclosing the object cannot specify whether or not the internal opening belongs to the object.

In a point input approach, the user places a single point in the interior area of a target; object to specify the target object. There is a problem (indefiniteness) in this method in that it is not possible to uniquely determine how much of the area around the point belongs to the target object.

In a scribble approach, the user inputs a free-form curve that runs through the interior of an object, thereby specifying the target object. This method has an advantage in that the degree of indefiniteness is low with respect to the designation of an area belonging to the target object. Interactive segmentation utilizing a scribble is thus considered to be promising.

One method for achieving interactive segmentation utilizing a scribble is to train a neural network through a learning process such as to output an object mask, representing the area of a target object in response to an inputting of an RGB image and a scribble. This requires the preparation of a large number and variety of RGB images, scribes, and object masks as training data. More specifically, thousands of or tens of thousands of different images need to be used as inputs to learn a diverse nature of images, and a number of scribbles having varying shapes and sizes need to be provided for each image in order to learn a diverse nature of scribbles.

However, it is not viable to manually add a large number of scribbles having varying shapes and sizes to each of the thousands of or tens of thousands of images. In view of this, it greatly improves efficiency if scribbles are automatically generated based on the object masks that have been created for use as training data (i.e., correct output data) or the like for machine learning.

For example, the area of an object mask may be subjected to thinning to automatically generate a curved line like a scribble. Lines that are generated by thinning, however, often have branches, and end up having a different shape from a manually entered scribble. Namely, lines generated by thinning cannot imitate the shape of a manually generated scribble.

Accordingly, it may be preferable to provide a scribble generation technique that generates a curved line imitating the shape of a manually generated scribble.

Figure 1:
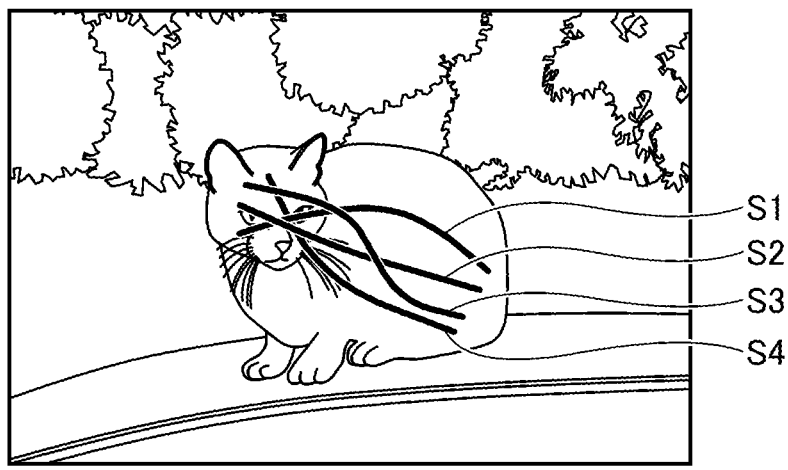
FIG. 1 is a drawing illustrating examples of scribbles depicted on the image of a target object.
Figure 2:
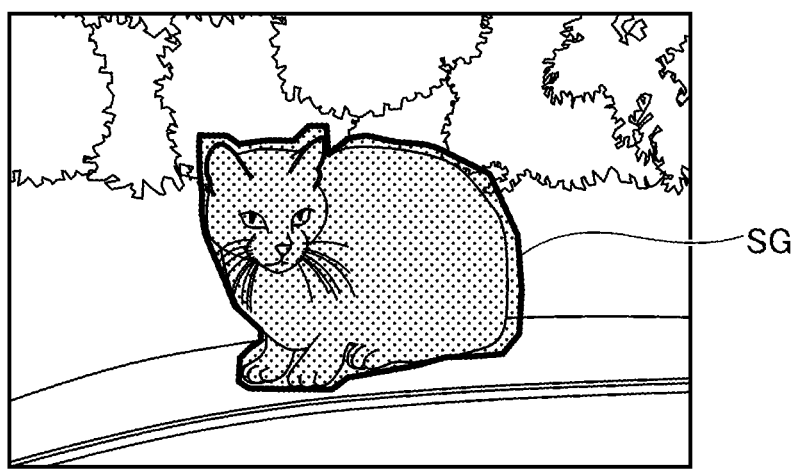
FIG. 2 is a drawing illustrating an example of a segmented image area of the target object.

FIG. 1 is a drawing illustrating examples of scribbles depicted on the image of a target object. FIG. 2 is a drawing illustrating an example of a segmented image area of the target object. When a cat image as illustrated in FIG. 1 is provided, a person may draw a curved line like one of the scribbles S1 through S4, for example, to specify the image area of the target image. In interactive segmentation, when the scribble S1 is drawn, for example, this scribble S1 may be used as a clue to generate a segmented image SG as illustrated in FIG. 2. In order to achieve such interactive segmentation by machine learning, it is preferable to automatically generate natural scribbles to generate a large amount of training data.

A method of automatically generating scribbles may utilize an object mask (i.e., object area information representing the image area of a target object in the image) that has already been created for use as training data (correct output data) for machine learning. Namely, object area information representing the image area SG of the target object as illustrated in FIG. 2 is used as an input to automatically generate scribbles.

Natural scribbles that are usable as training data for machine learning preferably satisfy the following three requirements;
<Requirement 1> scribbles run through substantially the center of a target object;
<Requirement 2> scribbles are a single line (not branching) for ease of inputting; and
<Requirement 3> there are diverse variations in scribbles in order to represent differences in individual's manual inputting.

It is conceivable that a person draws a scribble by looking at the global shape (i.e., overall shape) of an object rather than looking at local features. When an image of an animal is given, for example, a scribble may be drawn by estimating, based on the global shape, how a curved line extends through substantially the center of the animal's body, while ignoring local features such as the animal's legs, tail, ears, etc. Natural scribbles thus preferably satisfy the requirement 1 and the requirement 2 described above.

For the cat image illustrated in FIG. 1, for example, curved lines such as the scribbles S1 through S4 may be manually drawn. All of the scribbles S1 through S4 are a single curved line extending through substantially the center of the target object, and thus satisfy the requirements 1 and 2 described above.

It may be further noted that the center position of an object recognized by a person is not precise, and the center position of a scribble varies depending on the person who draws the scribble. In the example illustrated in FIG. 1, for example, a scribble may be drawn close to the upper end of the cat's body as in the case of the scribble S1, or may be drawn close to the lower end of the cat's body as in the case of the scribble S4. Scribbles could be drawn at any locations. It may be further noted that the global shape recognized by a person also varies from individual to individual, so that the shape of scribbles greatly differs depending on the person who draws the scribbles. Like the scribbles S1 through S4 illustrated in FIG. 1, a curved line may have a bulge extending upward, a bulge extending downward, a wavy form, and a shape close to a straight line. The shape of scribbles can greatly vary in this manner. As is understood from these examples, natural scribbles thus preferably satisfy the requirement 3 described above in addition to the requirement 1 and the requirement 2 described above.

In the technology of the present disclosures, distance transform is used to satisfy the requirement 1 and the requirement 2. The distance transform is a transform that assigns to any given pixel a value of the shortest distance between the position of the given pixel and the position of another pixel that has a value of zero and that is positioned closest to the given pixel. A value of zero is set to all the pixels outside the image area SG of the target object as illustrated in FIG. 2. Applying distance transform to each pixel inside the image area SG creates a distance map that shows distance values assigned to all the pixels inside the image area SG. Namely, a distance map is calculated that shows, at each pixel position inside the image area SG, the value of a distance from the contour of the target object.

Points having high distance values in the distance map calculated in this manner are situated at substantially the center of the object. Extracting pixels with a high distance value may thus make it possible to identify the points that satisfy the requirement 1 "passing through substantially the center of a target object." Further, in order to satisfy the requirement 2 "a single line without branching", a plurality of points having a higher distance value than neighboring points are detected such that, the points are placed along a ridge that is defined by the height corresponding to the distance value inside the image area SG and that extends in a predetermined direction. The line of points detected in this manner represents a ridge having high distance values extending in the predetermined direction, and can thus be regarded as a line of points representing a natural scribble. The predetermined direction may be the direction of the primary axis of the image area SG, for example. Obtaining a ridge extending in the primary-axis direction is equivalent to obtaining a ridge extending in the longitudinal direction of the image area SG, and readily provides a curved line properly reflecting the global shape of the target object.

Instead of calculating a ridge in the manner described above, a representative point in the distance map may be extracted, and, then, points are traced from the representative point in a direction in which the distance values are higher among the surrounding points, thereby detecting a line of points along a ridge. Alternatively, similarly to a potential field in an active contour model, a distance map may be used as a potential field with respect to a ridge. Optimization may then be performed such as to maximize the sum of energies on the plurality of discrete points forming a line of points on the ridge, thereby obtaining a center line represented by the line of points.

With the arrangement as described above, a single curved line extending through substantially the center of the target object with no branching may be extracted. The curved line generated in this manner satisfies the requirement 1 and the requirement 2 previously described, which is considered to satisfy the minimum requirements as a natural scribble. Moreover, in order to satisfy the requirement 3 "there are diverse variations" in addition to the requirement 1 and the requirement 2, randomness of position and randomness of shape may be introduced. Random numbers may be employed to implement randomness.

In the following, an embodiment of an image processing apparatus and a scribble generation method, which automatically generate a scribble satisfying the above-noted requirements, will be described in detail with reference to the accompanying drawings.

Figure 3:
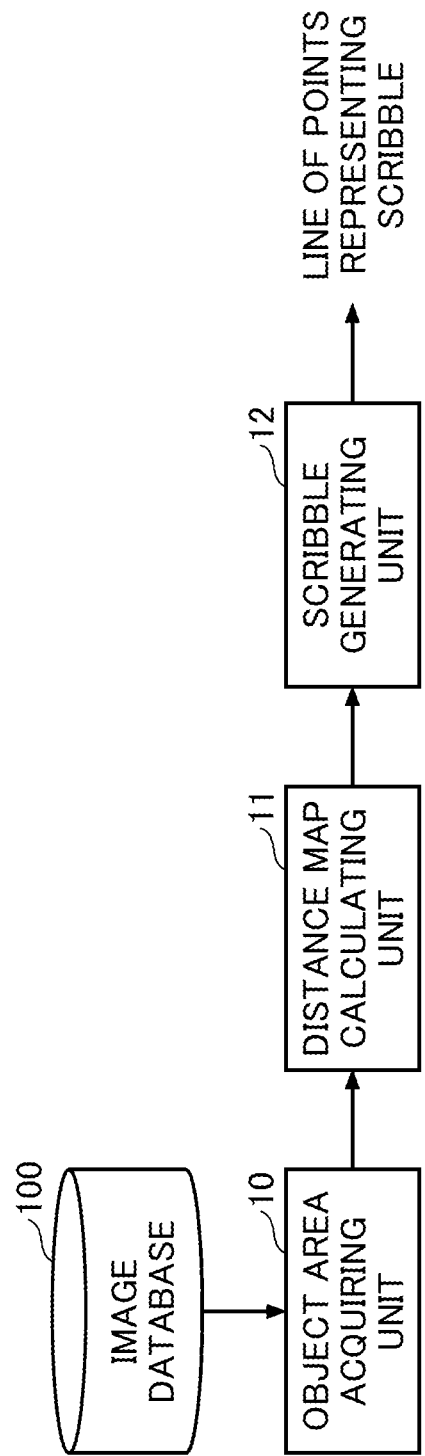
FIG. 3 is a drawing illustrating an example of the configuration of an image processing apparatus for automatically generating scribbles.

FIG. 3 is a drawing illustrating an example of the configuration of an image processing apparatus for automatically generating scribbles. In FIG. 3 and the subsequent similar drawings, boundaries between functional blocks illustrated as boxes basically indicate functional boundaries, and may not correspond to separation in terms of physical positions, separation in terms of electrical signals, separation in terms of control logic, etc. The image processing apparatus may have a hardware configuration implemented by combining electronic circuit blocks having the functions of respective functional blocks, or may have a software configuration in which the functions of respective functional blocks are implemented by software executed by a general-purpose processor that is an electronic circuit. In the case of software implementation, each functional block may be a software module that is logically separated from other blocks to some extent, or may indicate a function in a software module in which this and other blocks are logically combined together.

The image processing apparatus illustrated in FIG. 3 includes an object area acquiring unit 10, a distance map calculating unit 11, a scribble generating unit 12, and an image database 100. The image database 100 stores data sets for a plurality of images such that each data set includes an image and object area information paired therewith. Specifically, a plurality of sets each comprised of a given image and object area information paired therewith are stored in the image database 100 such that the object area information representing an image area of a target image in the given image is associated with the given image. The image processing apparatus receives object area information associated with a given image stored in the image database 100 to generate a scribble for the target image appearing in the given image.

Figure 4:
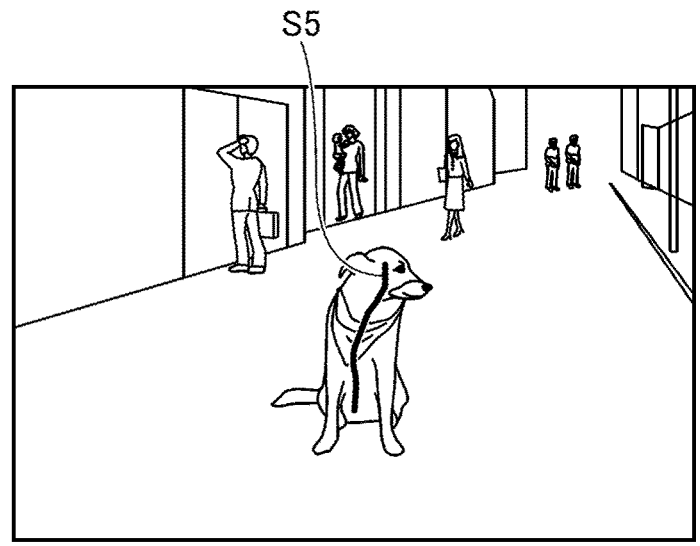
FIG. 4 is a drawing illustrating an example of an image input into the image processing apparatus.
Figure 5:
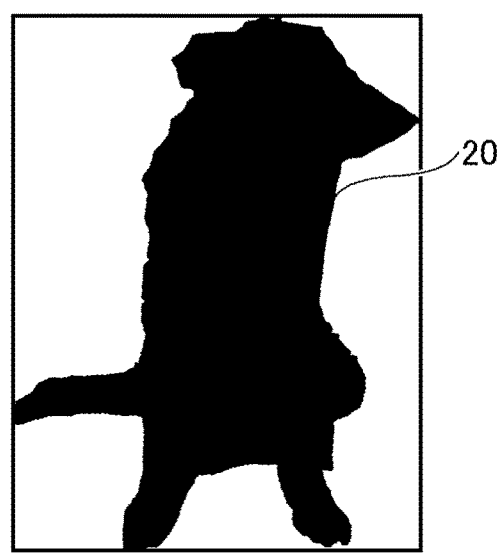
FIG. 5 is a drawing illustrating the image area of a target object in the input image illustrated in FIG. 4.

FIG. 4 is a drawing illustrating an example of an input image into the image processing apparatus. FIG. 5 is a drawing illustrating the image area of a target object in the input image illustrated in FIG. 4. In this example, a dog sitting in front in the image illustrated in FIG. 4 is a target object. An image area 20 illustrated in FIG. 5 is provided as object area information of this target object. The image as illustrated in FIG. 4 and the object area information as illustrated in FIG. 5 are stored in the image database 100 as a set. When the image illustrated in FIG. 4 is given, the image processing apparatus illustrated in FIG. 3 generates a scribble like a curved line S5, for example, based on the image area 20 illustrated in FIG. 5.

Data of the image area 20 of the target object (i.e., dog) illustrated in FIG. 5 may be configured such that the pixel value is a predetermined value (e.g., 1) within the image area of the target object, and the pixel value is another predetermined value (e.g., 0) outside the image area of the object (i.e., in the background image area). The object area acquiring unit 10 acquires object area information representing the image area 20 of the target object in the image as illustrated in FIG. 5 from the image database 100. The distance map calculating unit 11 receives the object area information from the object area acquiring unit 10 to perform distance transform based on the object area information, thereby calculating a distance map representing distance values from the contour of the target object inside the image area. Specifically, for each point (i.e., each pixel) of interest within the image area, a distance from the closest point (i.e., pixel) outside the target object is obtained, followed by assigning a value representing the distance to the point (i.e., pixel) of interest.

FIG. 6 is a drawing illustrating an example of a distance map obtained by distance transform. In FIG. 6, the shape of the image area 20 as illustrated in FIG. 5 is simplified for the sake of ease of illustration. Namely, the image area 20 illustrated in FIG. 5 in actuality includes hundreds of thousands of pixels, for example. However, a distance map image 21 in FIG. 6 illustrates, for the sake of explanation, an example of a distance map in which the image area 20 is comprised of a few tens of pixels having a distance value of greater than zero. Due to this, the leg shape illustrated in FIG. 5 is omitted in FIG. 6, for example.

In the distance map image 21 illustrated in FIG. 6, a distance value is assigned to each pixel inside the image area 20 illustrated in FIG. 5. In the example illustrated in FIG. 6, the distance value of a pixel represents the shortest distance between the pixel and the contour of the target image (i.e., the shortest distance between the pixel and a pixel outside the image area 20) as the number of pixels rounded to an integer value. The distance value may be either the Euclidean distance or the Manhattan distance.

The scribble generating unit 12 generates a line of points representing a curved line (i.e., a smooth free-form curve) reflecting the global shape of a target object based on a distance map as illustrated in FIG. 6. Specifically, the line of points representing the curved line noted above may be generated by detecting a plurality of points having a higher distance value than neighboring points in the distance map. More specifically, the scribble generating unit 12 may generate the line of points representing the curved line by detecting a plurality of points having a higher distance value than neighboring points such that the points are placed along a ridge that is defined by the height corresponding to the distance value inside the image area and that extends in a predetermined direction. With this arrangement, a line of points is readily generated that represents a curved line 22 that extends in a direction reflecting the global shape of the image area 20 of the target object and that is positioned near the center.

In principle, it is preferable that the curved line generated by the scribble generating unit 12 be a single curved line in order to satisfy the requirement 2 previously described. However, in view of the possibility of unusual cases, the curved line generated by the scribble generating unit 12 may not necessarily be limited to a single curved line. For example, a curved line may be a single stroke in principle, but if the shape of the image area of a target object is such as to bifurcate into large parts, it may suffice to use, as an exception, a curved line having a bifurcation point at which two branches originates. Namely, when a ridge bifurcates upon detecting a line of points along a ridge, it may suffice for the line of points to be also bifurcated into two lines of points. It may also suffice for a curved line generated by the scribble generating unit 12 to be bifurcated into two parts. The number of branching points and the number of branches are not limited to particular numbers.

Figure 7:
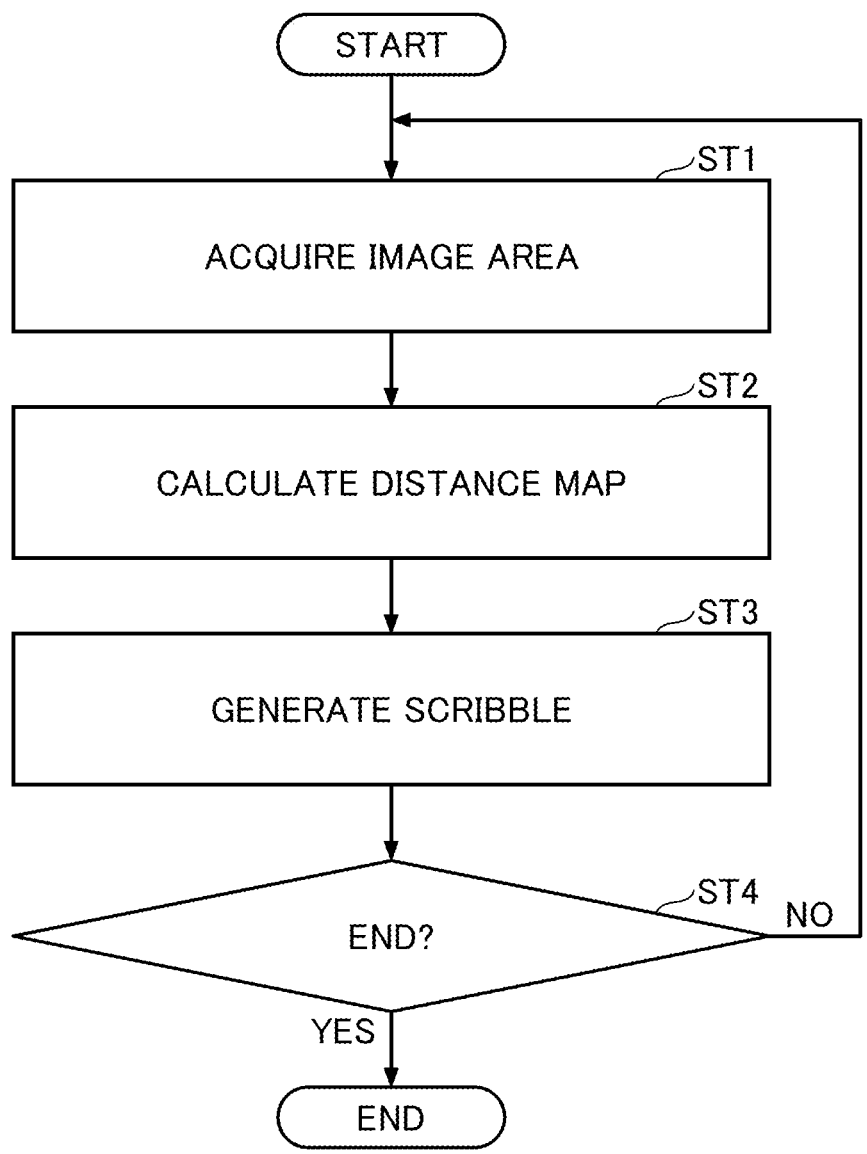
FIG. 7 is a flowchart illustrating an example of a scribble generating method.

FIG. 7 is a flowchart illustrating an example of a scribble generating method. The image processing apparatus illustrated in FIG. 3 performs the scribble generating method illustrated in FIG. 7. When the image processing apparatus illustrated in FIG. 3 is implemented as a computer, for example, the computer executes software implementing the scribble generating method to perform the scribble generating method.

It may be noted that, in FIG. 7 and the subsequent flowcharts, an order in which the steps illustrated in the flowchart are performed is only an example. The scope of the disclosed technology is not limited to the disclosed order. For example, a description may explain that, an A step is performed before a B step is performed. Despite such a description, it may be physically and logically possible to perform the B step before the A step while it is possible to perform the A step before the B step. In such a case, all the consequences that: affect the outcomes of the flowchart may be the same regardless of which step is performed first. It then follows that, for the purposes of the disclosed technology, it is apparent that the B step can be performed before the A step is performed. Despite the explanation that the A step is performed before the B step, such a description is not intended to place the obvious case as described above outside the scope of the disclosed technology. Such an obvious case inevitably falls within the scope of the technology intended by this disclosure.

In the step ST1, the object area acquiring unit 10 acquires object area information from the image database 100. In the step ST2, the distance map calculating unit 11 calculates a distance map from the object area information. In step ST3, the scribble generating unit 12 generates a scribble from the distance map. In step ST4, a check is made as to weather the required number of scribbles have been generated. In the case of generating another scribble, the procedure returns to step ST1, from which the subsequent steps are performed. In this case of having generated the required number of scribbles, the scribble generating process comes to an end.

Performing the scribble generating method illustrated in FIG. 7 enables generation of a single curved line extending through substantially the center of a target object with no branching. The curved line generated in this manner satisfies the requirement 1 and the requirement 2 previously described, which is considered to satisfy the requirements as a natural scribble. In order to satisfy the requirement 3 "there are diverse variations" in addition to the requirement 1 and the requirement 2, a process of adding randomness of position and randomness of shape may be included in the scribble generating process.

Figure 8:
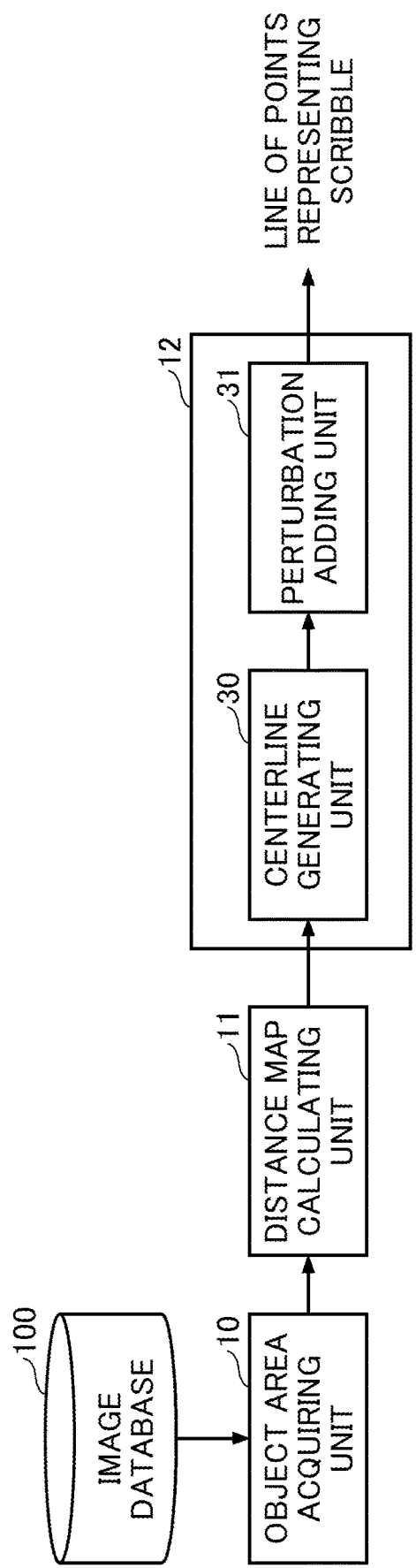
FIG. 8 is a drawing illustrating an example of the detailed configuration of the image processing apparatus for automatically generating scribbles.

FIG. 8 is a drawing illustrating an example of the detailed configuration of the image processing apparatus for automatically generating scribbles. In order to satisfy the requirement 3 "there are diverse variations," the image processing apparatus is configured such that a process of adding perturbation is included in the scribble generating process. In FIG. 8, the same or corresponding elements as those of the image processing apparatus illustrated in FIG. 3 are referred to by the same or corresponding numerals, and a description thereof will be omitted as appropriate.

In the image processing apparatus illustrated in FIG. 8, the scribble generating unit 12 includes a centerline generating unit 30 and a perturbation adding unit 31. The centerline generating unit 30 generates a line of points representing a curved line reflecting the global shape of a target object based on a distance map. Specifically, the centerline generating unit 30 generates the line of points representing the curved line noted above by detecting a plurality of points having a higher distance value than neighboring points in the distance map. Points having high distance values in the distance map are situated at substantially the center of the object. Extracting pixels with a high distance value may thus make it possible to identify the points that correspond to a line passing through substantially the center of a target object, i.e., to identify a line of points forming a centerline.

The perturbation adding unit 31 adds, to the line of points generated by the centerline generating unit 30, perturbation components generated based on random numbers in a direction different from the direction in which the curved line extends. In the present specification, the perturbation components refer to random components that are calculated for a curved line reflecting the global shape of a target object generated by the centerline generating unit 30, that are independent of the shape of the curved line, and that are used to shift the positions of respective points forming the line of points. The direction different from the direction in which the curved line extends refers to the direction different from the tangent direction of the curved line, and may be a normal direction of the curved line. Alternatively, the noted direction may be a direction perpendicular to the primary axis of the image area of a target object, which has served as a basis for the direction in which the curved line extends. Adding perturbation components in such a direction allows natural variation to be added to the shape of the curved line.

Figure 9:
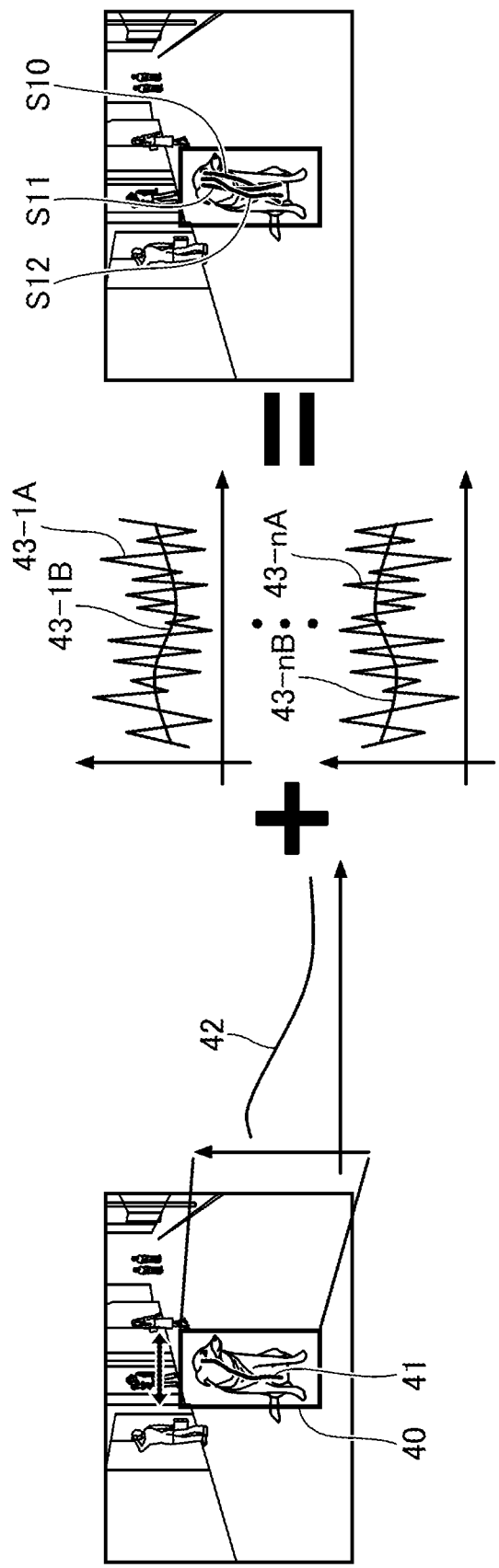
FIG. 9 is a drawing illustrating the addition of perturbation components.

FIG. 9 is a drawing illustrating the addition of perturbation components. In the image illustrated on the left-hand side of FIG. 9, a curved line 41 is the centerline generated by the centerline generating unit 30 with respect to the image area of a target object. In order to calculate perturbation components, a rectangular bounding box 40 is set to enclose the image of the target-object dog (more specifically, the image area 20 illustrated in FIG. 5). Among the four sides of the bounding box 40, the sides (e.g., long sides) extending in the direction in which the curved line 41 extends (e.g., in the direction of the principal axis of the image area 20) are used as the horizontal axis of a coordinate system, and the sides (e.g., short sides) extending perpendicularly to the noted direction are used as the vertical axis of the coordinate system, thereby to form a coordinate plane. The curved line 41 as plotted in this coordinate plane is illustrated as a curved line 42.

The perturbation adding unit 31 generates n random number series 43-1A through 43-nA, for example, in the above-described coordinate plane to introduce randomness. The n random number series 43-1A to 43-nA may be generated by assigning random numbers having a value between 0 and 1 to each discrete point (corresponding to each pixel on the long side) on the horizontal axis of the coordinate plane, for example. The perturbation adding unit 31 further applies smoothing to each of the random number series 43-1A to 43-nA by use of a filter that has a width corresponding to the length of the long side of the bounding box 40 and a height (i.e., value) corresponding to the length of the short side of the bounding box 40. This smoothing process produces n perturbation components 43-1B through 43-*n*B corresponding to the n random number series 43-1A through 43-*n*A, respectively. The perturbation adding unit 31 adds the n perturbation components 43-1B through 43-*n*B to the curved line 42 to produce n scribbles. The image depicted on the right-hand side of FIG. 9 illustrates three scribbles S10 through S12 generated by the perturbation adding unit 31 as described above.

Rather than performing a smoothing process based on a random number sequence, perturbation components or a curved line having randomness may be directly generated by using a Gaussian process, for example. For example, the mean of the Gaussian process may be set to zero, with the variance set in response to the size of the bounding box, to create a model with no observed values. Values are sampled from this model to generate smooth perturbation components. Alternatively, a model using a detected centerline as observed values may be created, values are then sampled from such a model to directly generate a curved line having randomness.

In the following, a centerline generating process performed by the centerline generating unit 30 and a perturbation adding process performed by the perturbation adding unit 31 will be described in detail.

Figure 10:
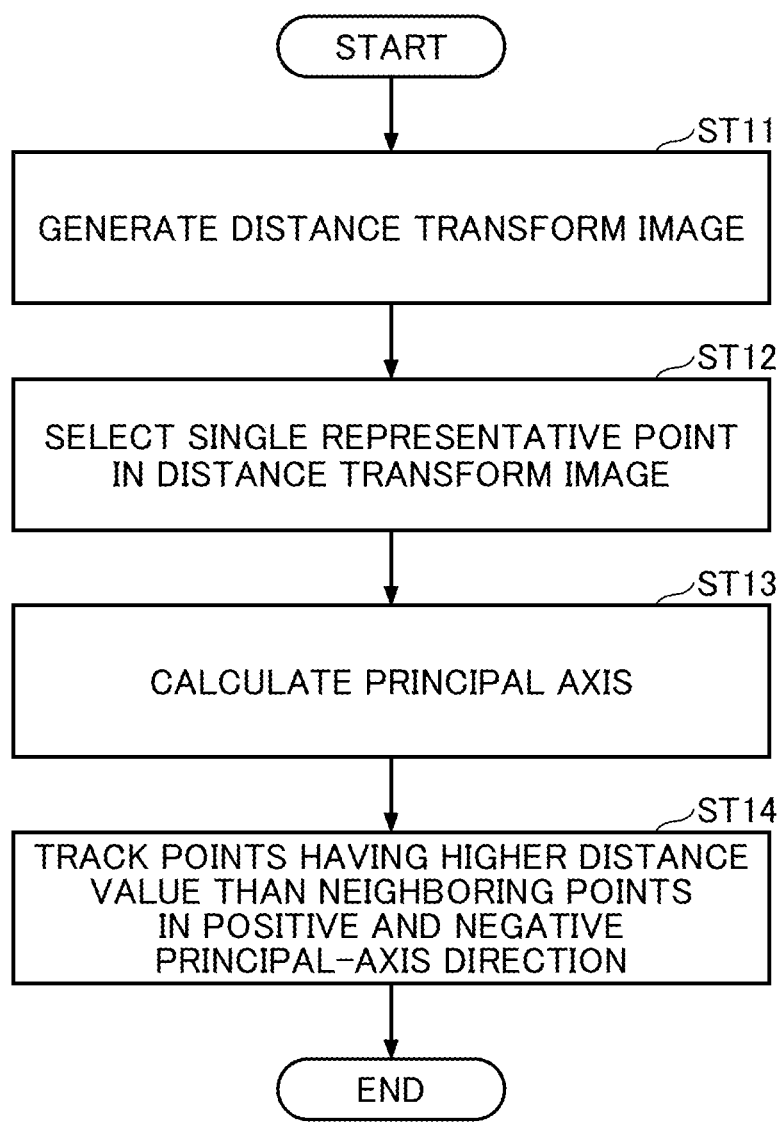
FIG. 10 is a flowchart illustrating an example of the method of generating a centerline.

FIG. 10 is a flowchart illustrating an example of the method of generating a centerline. The image processing apparatus illustrated in FIG. 8 performs the centerline generating method illustrated in FIG. 10. When the image processing apparatus illustrated in FIG. 8 is implemented as a computer, for example, the computer executes software implementing the centerline generating method to perform the centerline generating method.

In step ST11, the centerline generating unit 30 generates a distance transform image. Namely, a distance map in which a distance value is assigned to each pixel in the image area is generated. In step ST12, the centerline generating unit 30 selects a single representative point in the distance transform image. The representative point may be a point, which has a maximum distance value in the distance map inside the image area, for example. In step ST13, the centerline generating unit 30 calculates the principal axis of the image area. For example, the direction of the principal axis may be obtained by determining the shortest distance between each pixel and a given axis in the image area, calculating the sum of the shortest distances with respect to all the pixels in the image area, and adjusting the position and slope of the given axis such as to minimize the sum.

In the step ST14, the centerline generating unit 30 tracks points having a higher distance value than neighboring points in the positive and negative principal-axis direction. Here, the point having a higher distance value than neighboring points may be a pixel having a relatively large distance value as obtained when the distance values of pixels (which are arranged in the direction substantially perpendicular to the principal axis) are compared with each other in the direction substantially perpendicular to the principal axis. Further, the term "tracking" refers to an act of tracking points having a relatively high distance values in the positive and negative principal axis directions from the representative point obtained in step ST12 such as to trace a ridge peak extending along the direction of the principal axis (i.e., approximately in parallel to the principal axis). For example, a point having the highest distance value is successively selected among the points present in a predetermined angle range centered on a first direction (i.e., the direction of the principal axis) to proceed from the current point. The total length of the line of points selected by tracking may be set to a predetermined proportion (e.g., 80%) of the image area of the target object, for example. This allows a curved line having an appropriate length and serving as a basis for a scribble to be generated.

It may be noted that the line of consecutive points immediately next to one another generated by tracking as described above may be used, as it is, as a line of points forming a curved line generated by the centerline generating unit 30. Alternatively, points are sampled from the line of points generated in such a manner at intervals equal to a predetermined number of points, thereby providing a plurality of points arranged at predetermined intervals. With respect to the plurality of points arranged at such predetermined intervals, the centerline generating unit 30 may generate a curved line by fitting a free-form curve, such as a spline curve, to run through the plurality of points.

Figure 11:
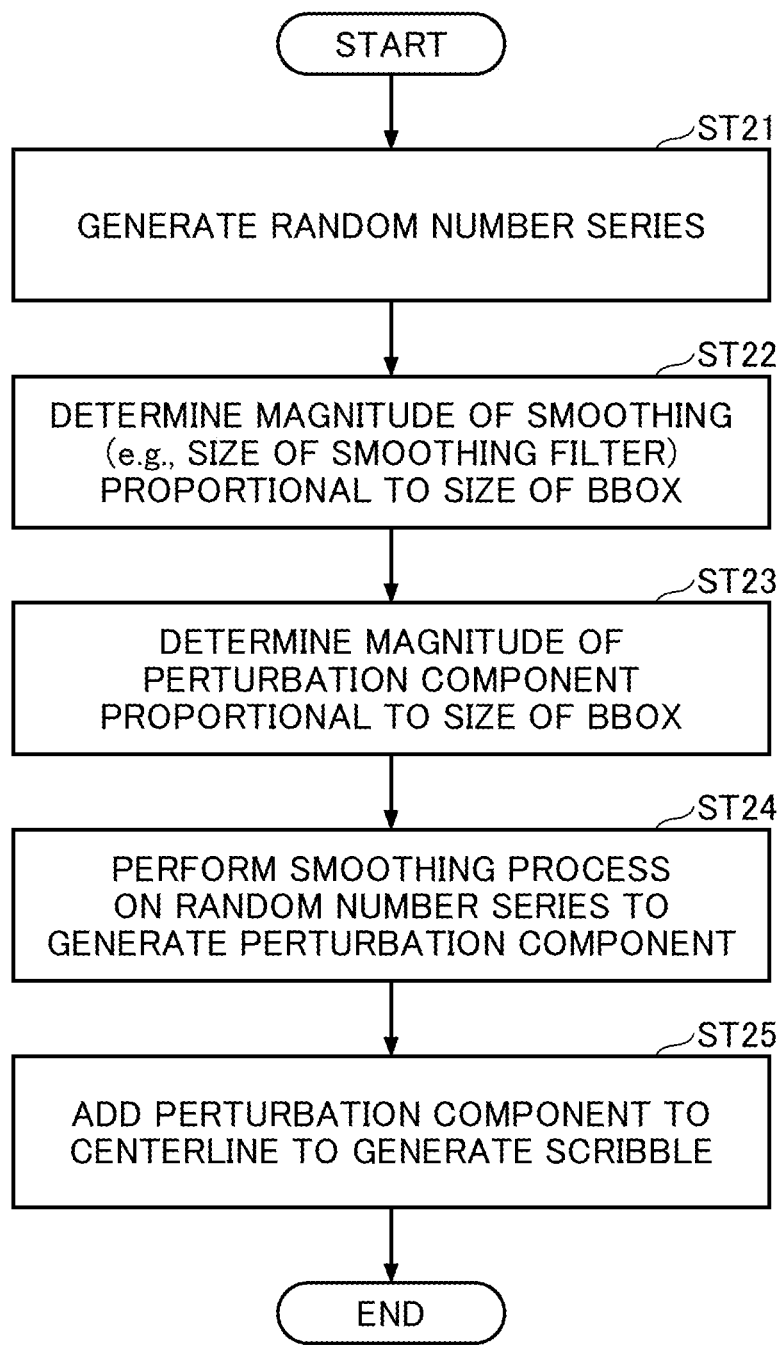
FIG. 11 is a flowchart illustrating an example of the method of adding perturbation components.

FIG. 11 is a flowchart illustrating an example of the method of adding perturbation components. The image processing apparatus illustrated in FIG. 8 performs the perturbation adding method illustrated in FIG. 11. When the image processing apparatus illustrated in FIG. 8 is implemented as a computer, for example, the computer executes software implementing the perturbation adding method to perform the perturbation adding method.

In step ST21, the perturbation adding unit 31 generates a random number series. In step ST22, the perturbation adding unit 31 determines the magnitude of smoothing proportional to the size of the bounding box (BBOX) enclosing the image area of a target object. The shape of the bounding box is rectangular, and the direction of the bounding box may be set such that the longitudinal direction thereof coincides with the principal-axis direction of the image area of a target object, for example. The magnitude of smoothing may be such that the width of a filter used in a smoothing process is set to a predetermined proportion of the length of the long side of the bounding box extending along the principal axis of the image area of a target object, for example. This arrangement makes it possible to generate, as a perturbation component, a waveform having an appropriate period (or frequency) responsive to the principal-axis length of the image area of a target object. The filter is not limited to a particular shape, and may be a Gaussian or rectangular filter, for example.

If a perturbation component vibrating finely at a period of 1/100 times the length of the long side of a bounding box is added to a curved line extending in the principal-axis direction at or around the center of the image area of a target object, a resulting scribble will not have a natural shape. If a perturbation component vibrating at a long period of 10 times the length of the long side of a bounding box is added to a curved line extending in the principal axis direction at or around the center of the image area of a target object, a resulting scribble will not exhibit proper fluctuation. Accordingly, it is preferable to set the width of a filter used in a smoothing process to a predetermined proportion of the length of the long side of a bounding box so as to generate a waveform having an appropriate period (or frequency) as a perturbation component.

In step ST23, the perturbation adding unit 31 determines the magnitude of perturbation components proportional to the size of a bounding box. The magnitude of perturbation components may be such that the height (value) of a filter used in a smoothing process is set to a predetermined proportion of the length of the short side of a bounding box extending perpendicularly to the principal axis of the image area of a target object, for example. This arrangement makes it possible to generate, as a perturbation component, a waveform having an appropriate amplitude responsive to the width of the image area of a target object perpendicular to the principal axis thereof.

In step ST24, the perturbation adding unit 31 uses a filer whose width and height are set as described above to perform a smoothing process on a random number series, thereby generating a perturbation component. That is, a filtering process is applied to the random number series to generate a perturbation component. Applying a smoothing process to a random number series makes it possible to readily generate a perturbation component suitable for adding natural variation to a scribble. In step ST25, the perturbation adding unit 31 adds the perturbation component to the centerline to generate a scribble.

In the manner described above, a natural scribble is automatically generated that resembles a manually generated scribble with respect to the image area of a target object. Further, as will be described in the following, use of scribbles automatically generated in such a manner as input training data allows machine learning to be efficiently performed with respect to interactive segmentation that separates image areas based on the scribbles.

Figure 12:
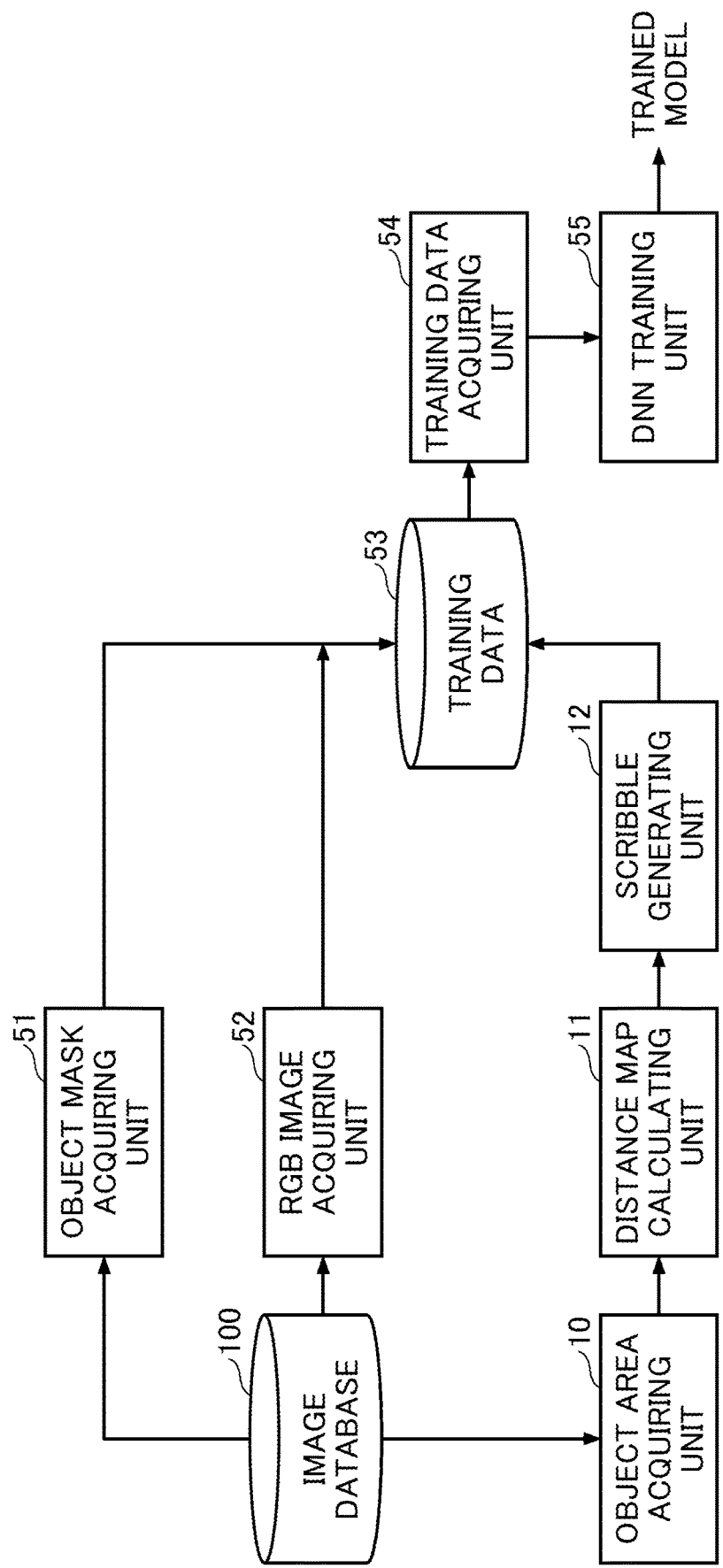
FIG. 12 is a drawing illustrating an example of the configuration of an image processing apparatus for performing machine learning with respect to interactive segmentation.

FIG. 12 is a drawing illustrating an example of the configuration of an image processing apparatus for performing machine learning with respect to interactive segmentation. The image processing apparatus illustrated in FIG. 12 includes the object area acquiring unit 10, the distance map calculating unit 11, the scribble generating unit 12, an object, mask acquiring unit 51, an RGB image, acquiring unit 52, training data 53, a training data acquiring unit 54, a DNN training unit 55, and the image database 100.

The object area acquiring unit 10, the distance map calculating unit 11, and the scribble generating unit 12 perform the scribble generating process as previously described to generate a plurality of scribbles having diverse variations for each of a plurality of images stored in the image database 100. The object mask acquiring unit 51 acquires object masks (i.e., object area information) associated with a large number of images stored in the image database 100. The RGB image acquiring unit 52 acquires a number of images (e.g., RGB images) stored in the image database 100. The training data 53 is a database in which a plurality of images, a plurality of object masks having one-to-one correspondence with the plurality of images, and a plurality of scribbles associated with each of the plurality of images, as acquired or generated as described above, are stored as a training data set for machine learning.

The training data acquiring unit 54 acquires the plurality of images and the plurality of scribbles associated with each image as input training data from the training data 53, and acquires the plurality of object masks associated in one-to-one correspondence with the plurality of images as output training data (i.e., supervisory data). The DNN training unit 55 feeds to a deep neural network the input training data serving as inputs and the output training data serving as correct outputs, thereby training the deep neural network such that the correct output data is produced in response to the input data. Data (such as optimized weight parameters) relating to the deep neural network trained by the DNN training unit 55 is output as trained data.

Figure 13:
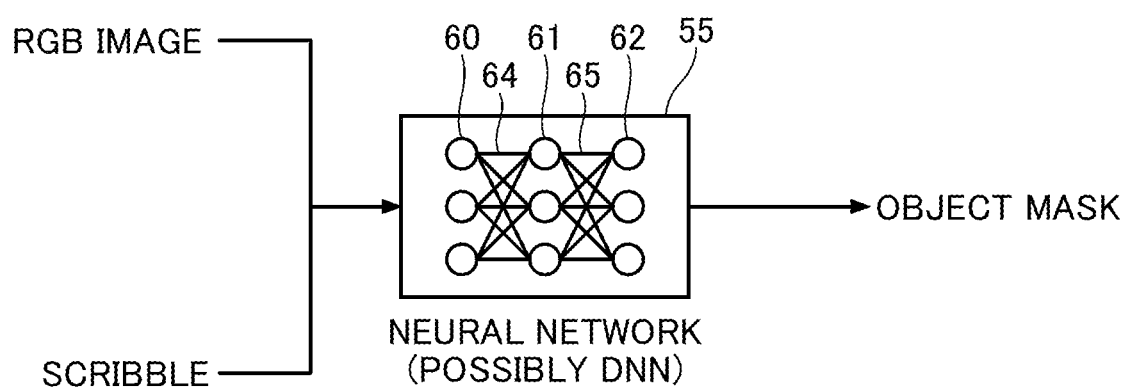
FIG. 13 is a drawing illustrating an example of a machine learning model.

FIG. 13 is a drawing illustrating an example of a machine learning model. The DNN training unit 55 includes a neural network that includes an input layer 61, an intermediate layer 62, an output layer 63, and connections 64 and 65 between the layers. In the case of a deep neural network, the intermediate layer includes two or more layers coupled together via connections between the layers. Although FIG. 13 illustrates fully connected layers only, the layers of the neural network are not limited to the fully connected layers, and may include one or more convolution layers, one or more normalization layers, and the like. The DNN training unit 55 learns the weight parameters of connections between the layers such as to achieve desired input-to-output relationships based on plurality of images (e.g., RGB images), a plurality of curved lines (i.e., auto-generated scribbles), and object area information (i.e., object masks).

Specifically, the DNN training unit 55 receives a plurality of images and the plurality of curved lines generated for each of the plurality of images as input training data, and receives the object area information for the plurality of images as correct output data for training. The DNN training unit 55 uses the object masks as supervisory data (i.e., correct output data) to optimize the weight parameters of connections between the layers of the neural network such that correct object masks are output in response to the input images and the input scribbles. Performing machine learning in this manner enables efficient generation of a deep neural network that achieves scribble-based interactive segmentation with high accuracy.

Figure 14:
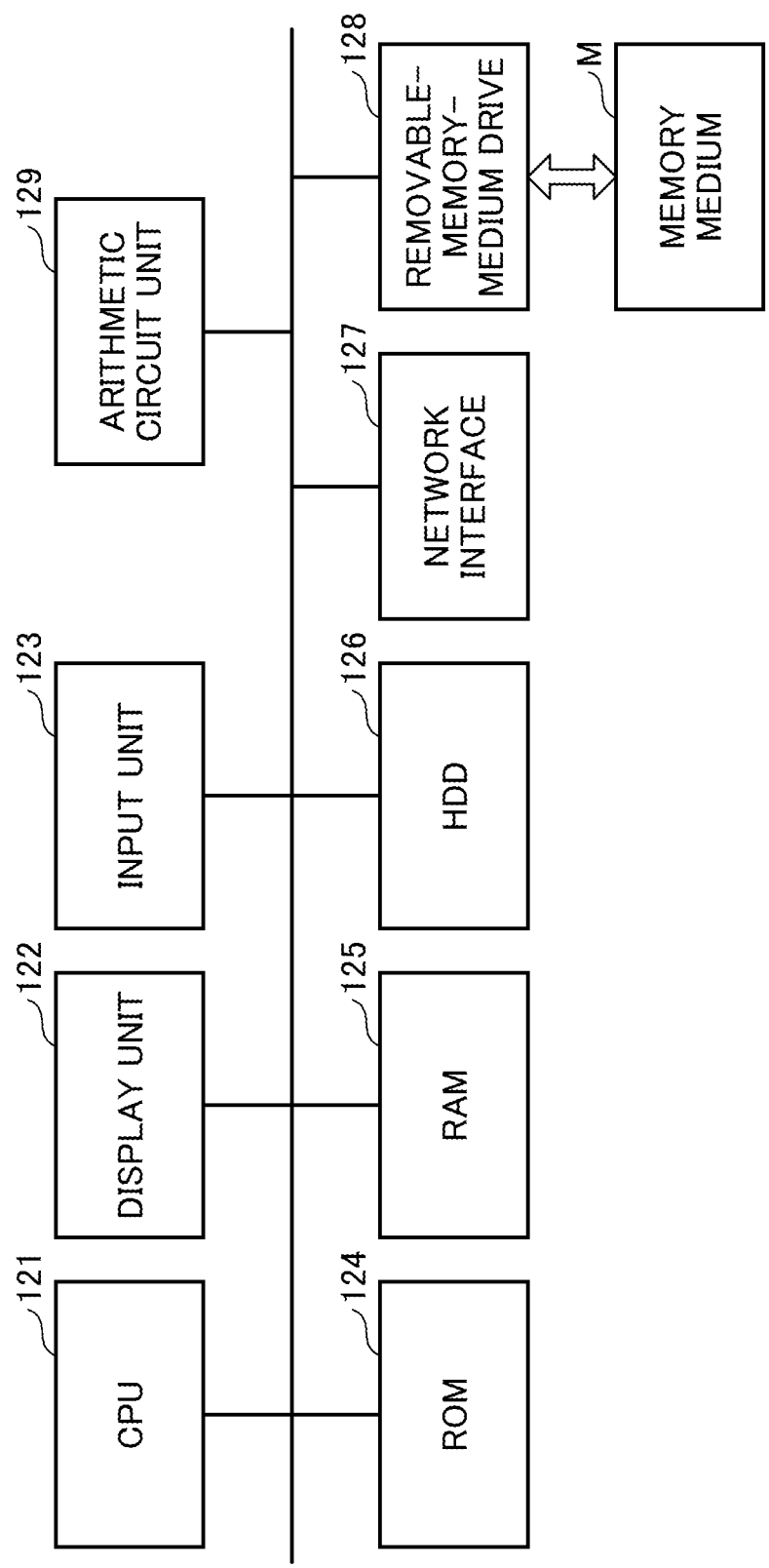
FIG. 14 is a drawing illustrating an example of the hardware configuration of the image processing apparatus.

FIG. 14 is a drawing illustrating an example of the hardware configuration of the image processing apparatus. The image processing apparatus illustrated in FIG. 1 includes a CPU 121, a display unit 122, an input unit 123, a ROM 124, a RAM 125, an HDD 126, a network interface 127, a removable-memory-medium drive 128, and an arithmetic circuit unit 129.

The input unit 123 provides user interface, and receives various commands for operating the image processing apparatus and user responses responding to data requests or the like. The display unit 122 displays the results of processing by the image processing apparatus, and further displays various data that make it possible for a user to communicate with the image processing apparatus. The network interface 127 is used to communicates with peripheral devices and with remote locations.

The image processing apparatus illustrated in FIG. 14 is a computer, and the scribble generating method and the machine learning method are provided as a computer program executable by the image processing apparatus. This computer program is stored in a memory medium M that is mountable to the removable-memory-medium drive 128. The computer program is loaded to the RAM 125 or to the HDD 126 from the memory medium M through the removable-memory-medium drive 128. Alternatively, the computer program may be stored in a memory medium (not shown) provided in a peripheral apparatus or at a remote location, and is loaded to the RAM 125 or to the HDD 126 from the memory medium through the network, interface 127.

Upon receiving user instruction for program execution from the input unit 123, the CPU 121 loads the program to the RAM 125 from the memory medium M, the peripheral apparatus, the remote memory medium, or the HDD 126. The CPU 121 executes the program loaded to the RAM 125 by use of an available memory space of the RAM 125 as a work, area, and continues processing while communicating with the user as such a need arises. The ROM 124 stores control programs for the purpose of controlling basic operations of the image processing apparatus.

By executing the computer program as described above, the image processing apparatus performs the scribble generating process and the machine learning process. The arithmetic circuit unit 129 may be dedicated hardware specifically designed for performing machine learning, and, for example, may be dedicated hardware such as a circuit or processor dedicated for matrix computation. In an alternative configuration, the dedicated arithmetic circuit unit 129 may not be provided. In such a case, the CPU 121, which is the processor of a general-purpose computer, may function as a machine learning computation unit to perform a machine learning algorithm.

According to at least one embodiment, a scribble generation technique is provided that generates a curved line imitating the shape of a manually generated scribble.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope oi the invention.

What is claimed is:

1. An image processing apparatus, comprising:
   a memory; and
   a processor coupled to the memory and configured to perform;
   acquiring object area information representing an image area of a target object in an image from an image database;
   using the object area information to calculate a distance, map representing distance values from a contour of the target object inside the image area; and
   generating, based on the distance map, a line of points representing a curved line reflecting a global shape of the target object.

2. The image processing apparatus as claimed in claim 1, wherein the processor is configured to generate the line of points by detecting a plurality of points having a higher distance value than neighboring points such as to trace a ridge that is defined by height corresponding to the distance values inside the image area and that extends in a certain direction.

3. The image processing apparatus as claimed in claim 1, wherein the processor is further configured to add, to the line of points, perturbation components generated based on random numbers in a direction different from a direction in which the curved line extends.

4. The image processing apparatus as claimed in claim 3, wherein the processor is configured to apply a smoothing process to a series of the random numbers to generate the perturbation components.

5. The image processing apparatus as claimed in claim 1, wherein the processor is further configured to function as a machine learning model, wherein the machine learning model is configured to receive, as input training data, a plurality of images and a plurality of curved lines generated in a same manner as the curved line for each of the plurality of images, and to receive the object area information for the plurality of images as correct output data for training.

6. An image processing method, comprising:
   acquiring object area information representing an image area of a target object in an image from an image database;
   using the object area information to calculate a distance map representing distance values from a contour of the target object inside the image area; and
   generating, based on the distance map, a line of points representing a curved line reflecting a global shape of the target object.

7. A non-transitory computer-readable recording medium having a program embodied therein for causing a computer to perform;
   acquiring object area information representing an image area of a target object in an image from an image database;
   using the object area information to calculate a distance map representing distance values from a contour of the target object inside the image area; and
   generating, based on the distance map, a line of points representing a curved line reflecting a global shape of the target object.

* * * * *